Feb. 9, 1965  R. J. HABER  3,168,939
ROTARY ENERGY ABSORBER UNIT DRAG CONTROL MEANS
Filed June 14, 1963  2 Sheets-Sheet 1
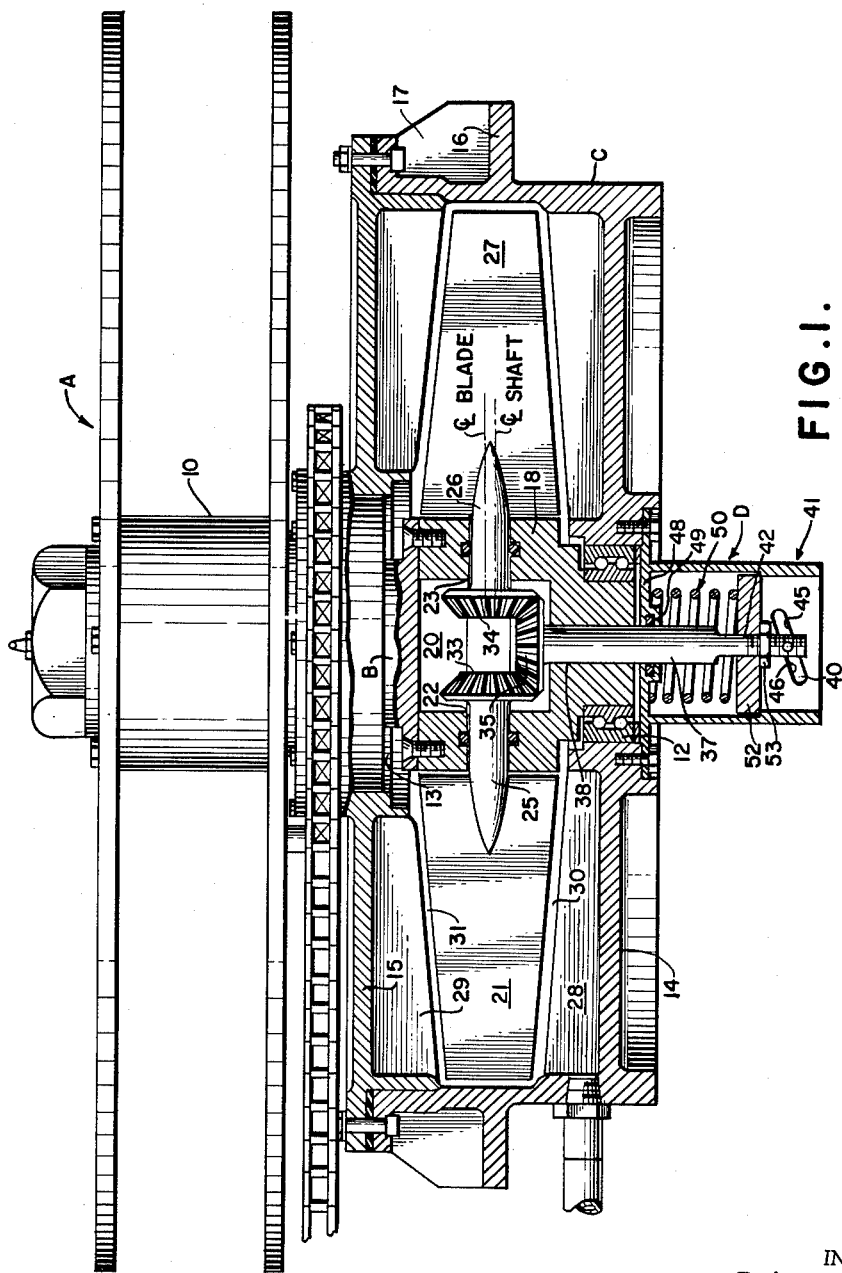
FIG.I.
INVENTOR
Robert J. Haber
BY  *Herbert M. Birch*
ATTORNEY Feb. 9, 1965  R. J. HABER  3,168,939
ROTARY ENERGY ABSORBER UNIT DRAG CONTROL MEANS
Filed June 14, 1963  2 Sheets-Sheet 2
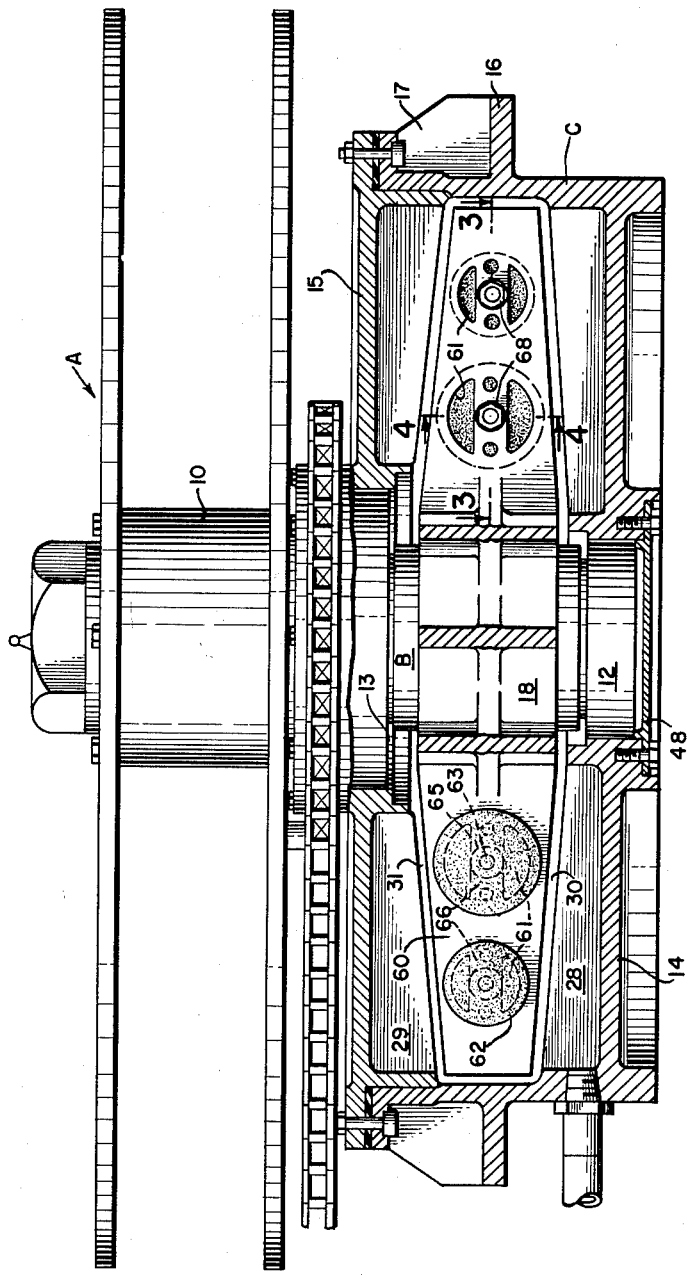
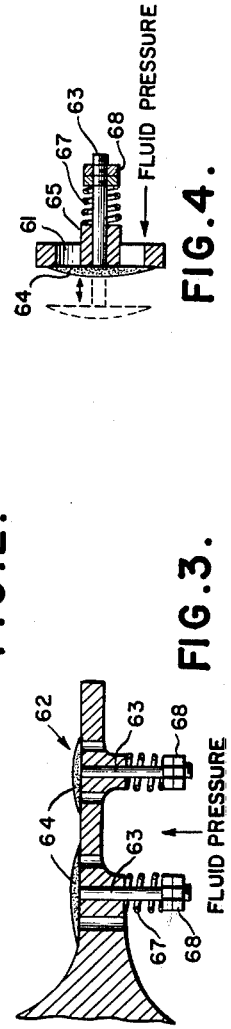
INVENTOR
Robert J. Haber
BY *Herbert M Birch*
ATTORNEY സ
United States Patent Office 3,168,939
Patented Feb. 9, 1965

3,168,939
ROTARY ENERGY ABSORBER UNIT DRAG
CONTROL MEANS
Robert Joseph Haber, Wilmington, Del., assignor to All
American Engineering Company, Wilmington, Del., a
corporation of Delaware
Filed June 14, 1963, Ser. No. 287,885
5 Claims. (Cl. 188—90)

The present invention is an improvement of my prior co-pending application Serial No. 233,543, filed October 29, 1962, for "Rotary Energy Absorber Unit Control Means" relating generally to energy absorber units for use with aircraft arresting gear, said units comprising a preset arresting load means including a rotor with radial blades in a liquid containing housing, said rotor being rotatable in the liquid in the housing by a force imparted thereto by the rotation of a tape or cable drum as a tape or cable wound on the drum in superimposed layers is unwound therefrom by an engaged mobile object, such as an aircraft and more particularly the invention relates to means to control the liquid drag effect on the rotor vanes in the said housing, to thereby control the drag forces of the liquid on said rotor to the drum.

With this invention as in the above earlier application it is an object to effect the "K" factor of the energy absorber unit through the liquid in the housing with respect to the vanes of the rotor therein. For example, the torque output of the rotor shaft varies as the square of the r.p.m. ($n$) or Torque=$K(n)^2$, where K is the over-all drag coefficient of the liquid on the rotor vanes in the unit.

Throughout the several embodiments hereinafter described relating to control of the liquid path to control the K factor of the unit, each of the units hereinafter described in detail comprises a drum, a tape wrapped in layers around the drum, such as a nylon tape, a housing containing liquid and a rotor therein immersed in the liquid having a shaft with an extended hub portion from the housing to which the tape drum is keyed so the drum and the rotor rotate together, whereby torque from the rotor in the liquid containing housing is applied to the tape as it is unwound from the drum by a pulling force, such as described in connection with prior co-pending application Serial No. 177,493 filed in the name of Donald B. Doolittle for an "Arresting Gear and Retrieve System," and assigned to the assignee of this invention.

An object of this invention is to provide means to control the liquid drag on the blades or vanes of a rotor immersed in a liquid in a housing, to thereby limit arresting loads imposed by the drag or retarding forces of the rotor blades or vanes in the liquid with respect to a preset arresting load to be imparted from a drum connected to the rotor shaft, which is rotated by the payout of cable, tape or the like as it is unwound from the drum by arresting loads developed to decelerate an aircraft of predetermined or known weight coupled to the cable, tape or the like.

Another object is to provide in an absorber unit, vane drag varying means, which means is manually adjustable to control the over-all drag coefficient of the absorber unit to preset loads.

The above and other objects and advantages of the present invention will appear more fully hereinafter from a consideration of the detailed description which follows, taken with the accompanying drawings wherein two embodiments thereof are illustrated. It is to be expressly understood, however, that the drawings are for the purpose of illustration only and are not intended as a definition of the limits of the invention.

In the drawings, wherein like reference characters refer to like parts through the several views;

FIGURE 1 is a cross section view of a first embodiment of the present invention showing a complete energy absorber unit with housing, stator blades, rotor with rotor vanes and tape reel or drum, and a drag control operating means for the rotor vanes.

FIGURE 2 is a second embodiment of the invention disclosing another form of drag control operating means and rotor vane arrangement in an absorber unit with a housing, stator blades and rotor member.

FIGURE 3 is a cross section view taken on line 3—3 of FIGURE 2; and

FIGURE 4 is a section view taken on line 4—4 of FIGURE 2.

Referring to the drawing in detail and first with reference to FIGURE 1 there is shown a drum or reel A having a spool core 10 vertically positioned on an extended end 11 of a rotor shaft B. The rotor shaft B is journalled in vertically spaced bearings 12 and 13 in the bottom and top walls 14 and 15 of a liquid sealed housing C.

The housing C is suitably anchored to a horizontal surface, not shown, by suitable means in an annular flange 16 formed around the housing, which has heat radiating and reinforcing fins 17.

The rotor shaft B is made with an enlargement to provide a gear box 18 for a rotor vane drag control unit D. This box 18 is interposed between the rotor shaft bearings of the bottom and top plates or walls and includes a gear chamber 20. The walls of the gear box around the chamber 20 are formed with bearing openings, such as 22 and 23 for rotor blade shafts, such as shown at 25 and 26.

These blade shafts are preferably formed integrally with the base end of each of the respective rotor blades 21 and 27 which blades extend horizontally toward the sides of the housing C with their faces vertical between vertically spaced opposed stator vanes 28 and 29 likewise having their faces in a vertical plane, which vanes are formed from the interior surface of the bottom wall 14 and of the top wall 15 in the housing.

The rotor blades and the stator vanes are complementarily shaped and proportioned to match, but to be spaced from each other in generally vertical relation, such space between rotor blades and stator vanes being generally indicated at 30 and 31. The rotor blades 21 and 27 are slightly eccentric about their center line with respect to their blade shafts and are held in operating position by a feather ring gear 35.

These spaces 30 and 31 are variable by the rotor blade adjusting or feathering means which comprises a bevel gear 33 keyed to vane shaft 25, a bevel gear 34 keyed to vane shaft 26 and the mating bevel gear or feather ring gear 35 keyed to a vertical rotor vane control shaft 37 extending from a journal opening leading from the bottom wall of the gear box 18 and a sleeve 41 with a cam slot 40. The control shaft 37 extends concentrically into the sleeve and has a reduced end portion 42 terminating adjacent the cam slot 40 in the sleeve 41 with a transverse cam follower, such as a pin 44 extending into the cam slot to engage the sloping lower and upper edges 45 and 46 of the sleeve which define the cam slot.

The sleeve 41 is anchored at its top rim to a biasing support plate 48 and the control shaft 37 extends through a liquid seal ring 49 centrally through this plate 48 into the said sleeve and through the center of a coiled spring 50. This spring is adjustable between the plate 48 and a second plate 52 linearly slidable on the reduced end of the shaft 37. The plate 52 may be limited as to movement by an adjusting nut 53 until the spring 50 is set to a preset load position.

The control means of this embodiment is adjustable to limit arresting loads imposed by the retarding forces of the rotor blades in the housing liquid to a preset load setting. For example, the feather ring gear 35 attached to control shaft 37 is caused to turn through the cam action of the pin in the cam slot 40 of sleeve 41 mounted exteriorly of housing C. The initial allowable load is set by running the adjusting nut up until the spring 50 is set to a predetermined arrest load. Thus arrest loads imparted on the eccentric rotor blades in excess of the arrest load allow the blades to rotate. Rotation of the feather ring gear 35 causes spring 50 to be depressed and the partially feathered rotor blades automatically adjust to carry the preset load. When the load becomes less than the preset load the blade returns to its original position.

Thus when using an arresting unit with the present novel preset arresting load control a substantially constant runout arrest device may be provided for known types and weights of aircraft.

A second embodiment for accomplishing the results of the above described embodiment, namely, a control means to limit arresting loads imposed by the retarding forces of the rotor blades of an arresting gear shock absorber unit of the type described is shown in FIGURE 2.

In this form of the invention the feathering rotor blades are replaced with rotor blades 60, formed with ports 61 held closed by spring load valves 62. These valves comprise a valve stem 63 and a valve head 64. The valve stem 63 is extended through a central boss 65 in a web 66 on each side of which is an arcuate opening or port 61 through the rotor blade 60. These arcuate openings are closed by the valve head 64 and the biasing action of a coil spring 67 adjustable between an adjusting nut 68 threaded on the free end of the valve stem 63. By running the nut up until the spring 67 is set against the surface of the boss 65, the loads on the rotor blade in access of the arrest load opens the valves. Pressure on the under side of the heads of the valve through the arcuate openings in the blades causes the springs to be compressed and the valves open as shown in FIGURE 4 to the dotted line position and thus automatically adjust to carry the preset load. When the load becomes less the fluid pressure is reduced and the valves automatically close by action of the preset springs.

Thus excess fluid pressure on the vane faces force the valves open and allow the load to be maintained at a preset level to provide a substantially constant runout arrestment of an aircraft rotating the drum A.

Without further description it is believed that the advantages of the present invention over the prior art is apparent and while only two embodiments of the same are illustrated, it is to be expressly understood that the invention is not limited thereto as various changes may be made in the combination and arrangement of the parts illustrated, as will not likely appear to others and those skilled in the art. For a definition of the scope or limits of the invention, reference should be had to the appended claims.

What is claimed is:

1. An energy absorber unit for arresting aircraft and mobile objects on a runway, said unit comprising a liquid filled housing, a drag rotor in the housing, said rotor having a rotor shaft with an extension above the top exterior of the housing, rotor blades secured to said shaft inside the housing with their effective area work surfaces vertical with respect to the bottom of the housing, a drum mounted on the rotor shaft extension with a winding of nylon strip material thereon for connection with runway arresting means, and normally closed valve means mounted in each rotor blade of said drag rotor for controlling the effective drag area of the working face of each rotor blade by opening the valve means by liquid pressure in said liquid filled housing.

2. An energy absorber unit for arresting aircraft and mobile objects on a runway, said unit comprising a liquid filled housing, a rotor in the housing, said rotor having a rotor shaft with an extension above the top exterior of the housing, rotor blades secured to said shaft inside the housing with their effective area work surfaces vertical with respect to the bottom of the housing, a drum mounted on the rotor shaft extension with a winding of strip material thereon for connection with runway arresting means, openings in the work faces of said blades, a central boss with a bore in each of said openings, a valve slidably supported in each boss, said valve having a valve stem, an adjusting nut threadable on the free end of said stem, a spring in said stem between said nut and said boss, and a valve head for each valve carried by the valve stem normally closing the openings in the blades, said valve heads being movable to open positions in response to pressure.

3. An energy absorber unit for arresting aircraft and mobile objects on a runway, said unit comprising a liquid filled housing, a rotor in the housing, said rotor having a rotor shaft with an extension above the top exterior of the housing, rotor blades secured to said shaft inside the housing with their effective area work surfaces vertical with respect to the bottom of the housing, a drum mounted on the rotor shaft extension with a winding of strip material thereon for connection with runway arresting means, and operatively connected blade drag control means for varying the effective area of the working face of each rotor blade to maintain a preset load level with a blade drag for arresting loads to be encountered during use, said control means compressing a spring loaded valve, said valve opening by liquid pressure at a preset load level during rotation of said rotor blades.

4. In a tape programmed fluid drag unit including a cylindrical liquid filled housing with vertically spaced upper and lower stator vanes and a rotor having radial rotor blades therein between the said vanes, a vertical rotor shaft on which said rotor is mounted, centrally positioned spaced rotor bearings, said vertical rotor shaft being journalled to rotate at each end in said bearings, a tape drum keyed to an extended end of said shaft exterior of the said housing, tape wound upon said drum in a single stacked annular convolution, said tape during unwinding from said drum rotating said rotor by programming the speed of rotation of said rotor according to the radius of the tape convolution from the core of the drum to the exterior convolution of said tape, to thereby control the drag effect of the said unit, and rotor drag control means carried by each rotor blade, said drag control including spring loaded check valve means, said valve means opening by liquid pressure at a preset load level during rotation of said rotor blades.

5. In a tape programmed fluid drag unit including a cylindrical liquid filled housing with vertically spaced upper and lower stator vanes and a rotor having radial rotor blades therein between the said vanes, a vertical rotor shaft on which said rotor is mounted, centrally positioned spaced rotor bearings, said vertical rotor shaft being journalled to rotate at each end in said bearings, a tape drum keyed to an extended end of said shaft exterior of the said housing, tape wound upon said drum in a single stacked annular convolution, said tape during unwinding from said drum rotating said rotor by programming the speed of rotation of said rotor according to the radius of the tape convolution from the core of the drum to the exterior convolution of said tape, to thereby control the drag effect of the said unit, said radial rotor blades having openings in the faces of said blades, and control means in the said openings for regulating the drag of said blades in the liquid filled housing, said control means comprising a central boss with a bore in each of said openings, a valve slidably supported in each boss, said valve having a valve stem, an adjusting nut threadable on the free end of said stem, a spring in said stem between said nut and said boss, and a valve head for each valve carried by the valve stem normally closing the openings in the blades, said valve heads being movable to open positions in response to pressure.

References Cited by the Examiner

UNITED STATES PATENTS

| | | | |
|---|---|---|---|
| 1,052,302 | 2/13 | Armstrong | 188—90 X |
| 2,032,966 | 3/36 | Yoxall | 188—90 X |
| 2,077,080 | 4/37 | Tolman | 188—90 |
| 2,156,133 | 7/39 | Troller | 230—122 |
| 2,349,350 | 5/44 | Jandasek | 188—90 |
| 3,093,352 | 6/63 | Hoffstrom | 244—110 |
| 3,140,761 | 7/64 | Doolittle | 244—110 |

FOREIGN PATENTS

| | | |
|---|---|---|
| 527,087 | 3/55 | Italy. |
| 733,691 | 7/32 | France. |

EUGENE G. BOTZ, *Primary Examiner.*